US006802405B2

United States Patent
Barcock et al.

(10) Patent No.: US 6,802,405 B2
(45) Date of Patent: Oct. 12, 2004

(54) FRICTION VIBRATION DAMPER

(75) Inventors: Carl L Barcock, Derby (GB); Geoffrey R Tomlinson, Stockport (GB)

(73) Assignee: Rolls-Royce plc, London (GB)

(*) Notice: Subject to any disclaimer, the term of this patent is extended or adjusted under 35 U.S.C. 154(b) by 8 days.

(21) Appl. No.: 10/073,097

(22) Filed: Feb. 12, 2002

(65) Prior Publication Data

US 2002/0121414 A1 Sep. 5, 2002

(30) Foreign Application Priority Data

Mar. 3, 2001 (GB) .............................................. 0105356

(51) Int. Cl.⁷ ................................................. F18F 9/30
(52) U.S. Cl. ........................ 188/268; 188/378; 248/638
(58) Field of Search .......................... 248/638; 188/268, 188/378, 379, 380; 52/167.6; 74/574

(56) References Cited

U.S. PATENT DOCUMENTS

| | | | | | |
|---|---|---|---|---|---|
| 2,732,040 A | * | 1/1956 | Vost et al. | ................... | 188/268 |
| 3,938,625 A | * | 2/1976 | Radermacher et al. | ...... | 188/268 |
| 4,011,929 A | * | 3/1977 | Jeram et al. | ................. | 188/268 |
| 4,706,788 A | * | 11/1987 | Inman et al. | ................ | 188/378 |
| 5,290,973 A | * | 3/1994 | Kwoh | .......................... | 181/199 |
| 5,735,257 A | * | 4/1998 | Walk | ............................ | 124/89 |
| 6,298,963 B1 | * | 10/2001 | Kim | ............................. | 188/379 |
| 6,508,343 B2 | * | 1/2003 | Misaji et al. | ................ | 188/379 |
| 6,543,590 B1 | * | 4/2003 | Monson | ....................... | 188/268 |

FOREIGN PATENT DOCUMENTS

| EP | 268716 A | 6/1988 |
|---|---|---|
| EP | 2241300 A | 2/1990 |
| EP | 1098069 A | 5/2001 |
| JP | 11217891 | * 8/1999 |

* cited by examiner

Primary Examiner—Robert A. Siconolfi
Assistant Examiner—Devon Kramer
(74) Attorney, Agent, or Firm—W. Warren Taltavull; Manelli, Denison & Selter, PLLC

(57) ABSTRACT

A friction vibration damper for damping the vibrations of a vibrating component comprising a body, a chamber and a plurality of elements, the body defines the chamber which is partially filled with the plurality of elements, the friction vibration damper, in use, disposed on or in the vibrating component characterized in that the friction vibration damper is configured to substantially prevent the elements operationally moving in a convection-like flow pattern.

3 Claims, 5 Drawing Sheets

(PRIOR ART)

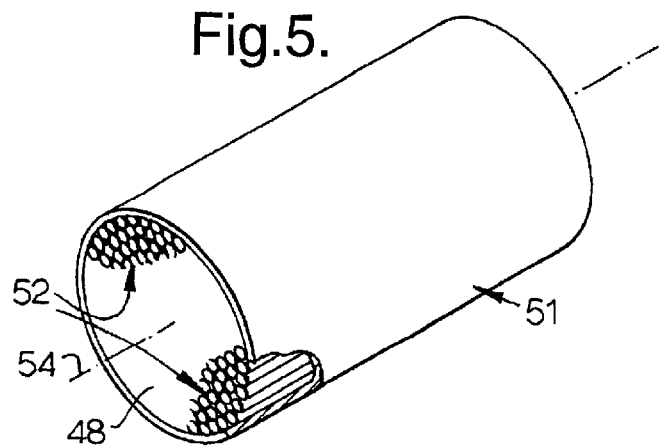
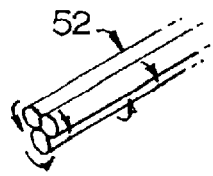
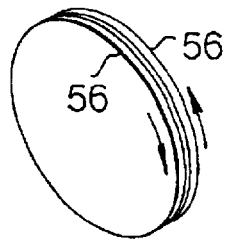
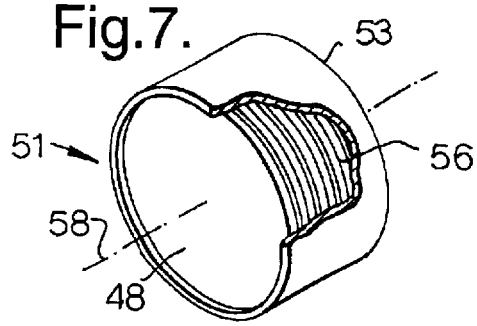
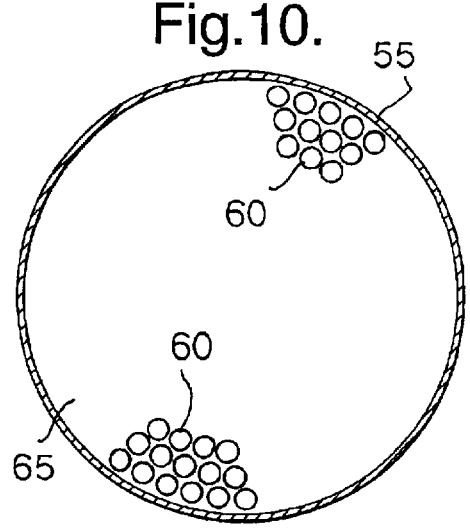
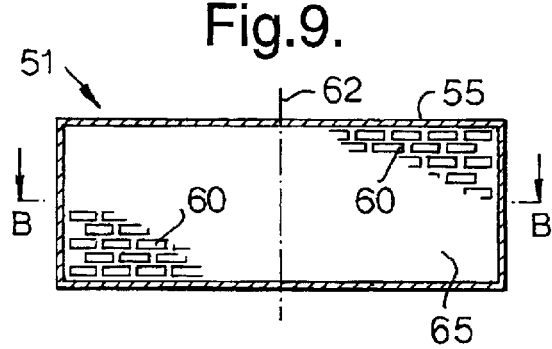
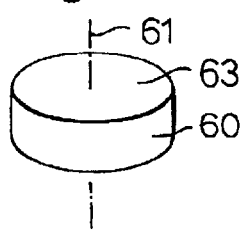
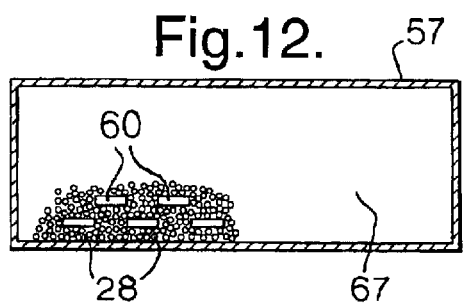

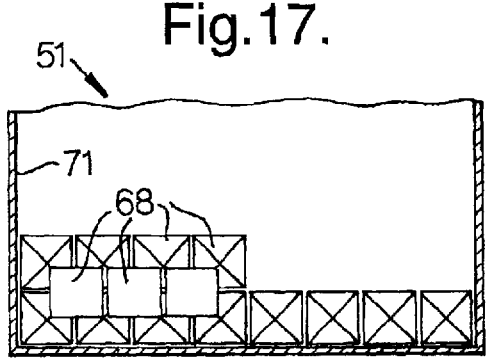
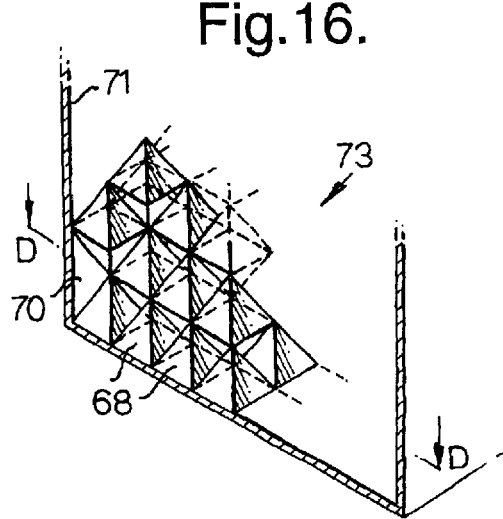
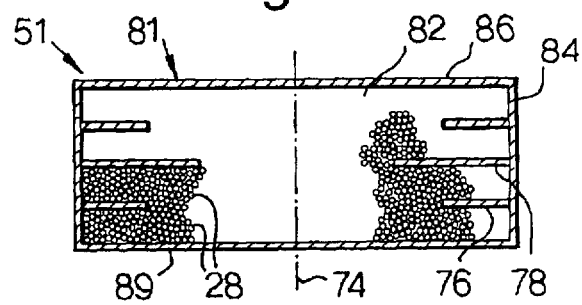
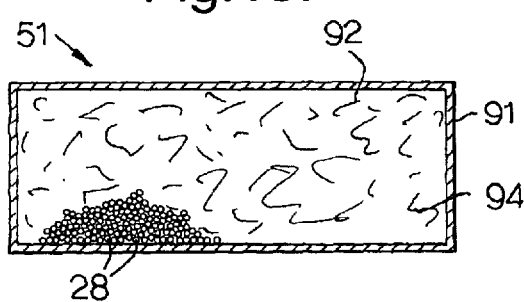
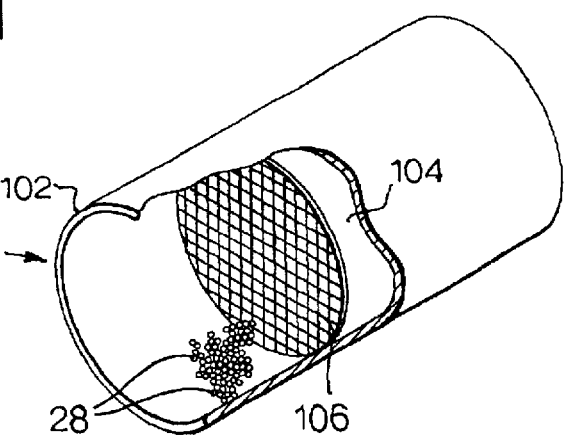

FRICTION VIBRATION DAMPER

FIELD OF THE INVENTION

The present invention relates to a friction vibration damper which is associated with controlling vibrations of a vibrating component and in particular, although not exclusively, a component of a gas turbine engine or a component of a machining operation.

BACKGROUND OF INVENTION

A combustor system of a gas turbine engine comprises a combustor chamber, a transition duct and an annular distribution chamber. The transition duct transmits hot gases from the combustion chamber to the annular distribution chamber, the hot gases then proceed into a turbine stage thereby driving the turbine.

In order to meet NOx (oxides of nitrogen) and CO (carbon monoxide) emission level requirements, turbulence of a fuel and air mixture is promoted to give acceptable combustion emissions. However, increasing the turbulence during the combustion process, to reduce emission levels, causes an increase of combustor noise which leads to an increase in vibratory stresses in the combustor system components. Combustor system components are vulnerable to high cyclic fatigue failure when the natural frequency of the component coincides or is close to coinciding with the acoustic frequency of the combustion process causing resonance of the component and consequently high vibratory amplitudes and hence high stresses in the component.

During a machining operation, for instance milling a metallic component, it is common for chatter to occur if the tooling or workpiece is of insufficient rigidity. Chatter is the vibration of the milling tool relative to the workpiece which results in either a reduction in the quality of the surface finish being machined or an increase in the machining process time where a better surface finish is required. In the manufacture, for instance, of aero-engine blisks this is of particular importance as the tough nature of the material, titanium, to be machined and the flexibility and low inherent damping of the workpiece severely curtails machining rates.

European Patent Application EP00309427.3 discloses a particle vibration damper having at least one chamber filled with a high percentage volume (95%) of substantially spherical elements. Vibration energy is damped by contact friction between the elements, however, as the level of excitation increases the elements begin to move in a convection-like flow pattern. When this convection-like flow occurs the effectiveness of the damper reduces.

SUMMARY OF THE INVENTION

It is an object of the present invention to provide a friction vibration damper which reduces or substantially prevents such a convection-like flow pattern.

According to the present invention there is provided a friction vibration damper for damping the vibrations of a vibrating component comprising a body having a chamber, the chamber partially filled with a plurality of elements, the friction vibration damper, in use, disposed on or in the vibrating component wherein the friction vibration damper is configured to substantially prevent the elements operationally moving in a convection-like flow pattern.

Preferably the plurality of elements comprise substantially spherical elements. Alternatively, the plurality of elements comprises substantially spherical elements of at least two discrete sizes. Furthermore, it is preferred that the elements are substantially spherical each with a diameter in the range 0.1 to 5.0 millimeters.

Alternatively, the plurality of elements comprise elements having a high aspect ratio and comprise elongate elements.

Alternatively the plurality of elements comprise elements having a low aspect ratio and comprise disc shaped elements.

Preferably the body comprises a baffle, the baffle disposed within the chamber to substantially prevent the elements operationally moving in a convection-like flow pattern. Furthermore the baffle extends across the chamber and may comprise a mesh structure. Alternatively the baffle comprises a "wire wool" matrix.

Preferably the body comprises the chamber having a high aspect ratio. Alternatively the body comprises the chamber having a low aspect ratio.

Preferably the friction vibration damper is mounted on a pedestal, the pedestal attached to the vibrating component.

Alternatively the body has two or more of the chambers and furthermore each of the chambers is partially filled with a plurality of elements of substantially the same size, each plurality of elements in each chamber being of a different discrete size.

Preferably the elements are metallic, but may be ceramic.

Preferably the chamber is filled with elements to between 90 and 100 percent by volume and in particular may be filled with elements to 95 percent by volume.

Similarly each of the chambers is filled with elements to 95 percent by volume.

Alternatively each of the chambers is filled with elements to a different percentage by volume of each chamber.

Preferably the body of the friction vibration damper is substantially cylindrical. Alternatively, the body of the friction vibration damper is substantially parallelepiped.

Preferably the vibrating component is a component of a gas turbine engine. Alternatively the vibrating component is a workpiece and the workpiece is subject to a machining operation. Similarly the vibrating component may be a machine tool or may be a machine.

Alternatively the friction vibration damper is disposed to the vibrating component by temporary means.

Preferably the component vibrates in the frequency range up to 10 Hertz.

Preferably a method of damping the vibrations of a vibrating component comprising the steps of, locating the position of the greatest amplitude of vibration on an engine component and disposing a vibration damping device on the component at the position of the greatest amplitude of vibration.

BRIEF DESCRIPTION OF THE DRAWINGS

A specific embodiment of the invention will now be described by way of example with reference to the accompanying drawing in which:

FIG. 5 shows a part cut away of a friction damper of the present invention comprising elongate frictional elements;

FIG. 6 shows the elongate elements rotating relative to one another;

FIG. 7 shows a part cut away of a friction damper of the present invention comprising a plurality of low aspect ratio frictional elements;

FIG. 8 shows the disc shaped elements rotating relative to one another for the embodiment of the present invention shown in FIG. 7;

FIG. 9 is a section of a friction damper of the present invention comprising a plurality of relatively low aspect ratio frictional elements;

FIG. 10 is a section B—B through the friction damper described with reference to FIG. 9;

FIG. 11 is an enlarged view of a relatively low aspect ratio frictional element as described with reference to FIG. 9;

FIG. 12 is a section through a friction damper of the present invention, comprising a plurality spherical elements and disc shaped elements;

FIG. 16 is a isometric cut-away view of the friction damper described with reference to FIG. 13 and shows a further configuration of tetrahedral shaped elements;

FIG. 17 is section D—D through the friction damper described with reference to FIG. 16;

FIG. 18 is a section through a friction damper, in accordance with the present invention, comprising baffles;

FIG. 19 is a section through a friction damper, in accordance with the present invention, comprising a wire-wool structure;

FIG. 20 is a section through a friction damper, in accordance with the present invention, comprising a mesh.

DETAILED DESCRIPTION OF THE INVENTION

Figure 1:
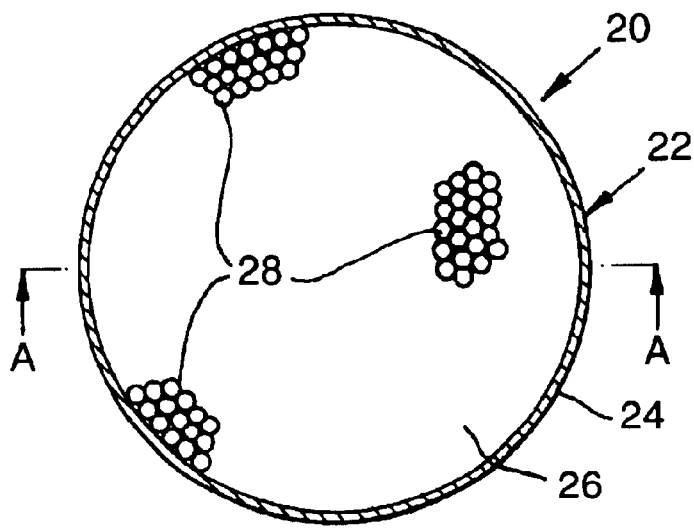
FIG. 1 is a top view of a section through a particle damper of the prior art EP00309427.3.
Figure 2:
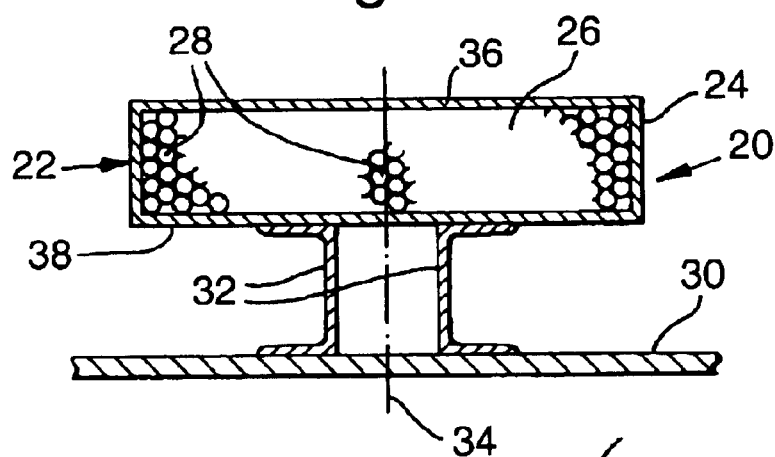
FIG. 2 is a cross section AA through a particle damper of the prior art EP00309427.3.

With reference to FIGS. 1 and 2 of the prior art EP00309427.3 the particle vibration damper 20 comprises a generally cylindrical body 22, an annular wall 24 of the body 22 defines a chamber 26, the chamber 26 contains a plurality of particles 28. The particles 28 are generally spherical in shape and are 0.6 millimeters in diameter. The chamber 26 has an approximate volume of 50000 cubic millimeters. The body 22 and particles 28 are manufactured from steel. The chamber 26 is filled with 95% of particles 28 by volume. One vibration damper 20 is attached to the outside of a wall panel 30 of a vibrating component, which in the specific embodiment is a transition duct of an industrial gas turbine engine (not shown).

The volume fill is defined as a percentage of the maximum theoretical density of particles 28 fully occupying a given volume. Thus a 95% volume fill represents 95% of the volume of particles 28 when at their maximum theoretical density in that given volume. In practice this is achieved by filling the chamber 26 with particles 28 and vibrating the particle vibration damper 20 so that the particles 28 achieve their maximum density. More particles 28 are then added to the particle vibration damper 20 and further vibrated to compact the particles 28 to the maximum density. This process is continued until the chamber 26 of the particle damper 20 is completely full. The particles 28 (and the particle vibration damper 20 if the weight of the damper 20 is known) are then weighed and 5 percent of the weight of the elements 28 is then removed. It should be noted that for any given density of particles 28 of a given volume, a 95% fill by volume is equivalent to a 95% fill by weight.

The particle vibration damper 20 comprises a pedestal 32 which is designed to transmit vibratory amplitudes from the transition duct to the body 22 of the vibration damper 20 whilst maintaining a space between the body 22 and the transition duct. The cooling air flow around the combustor chamber 38 also acts to cool the vibration damper 20. Cooling of the vibration damper 20 is not essential, but is preferred for this specific application. The pedestal 32 is not an essential feature of the vibration damper 20, but it is preferred. It is preferable to position the vibration damper 20 so that its polar axis 34 is orientated parallel to the principal vibratory displacement direction of a wall of the transition duct.

Figure 3:
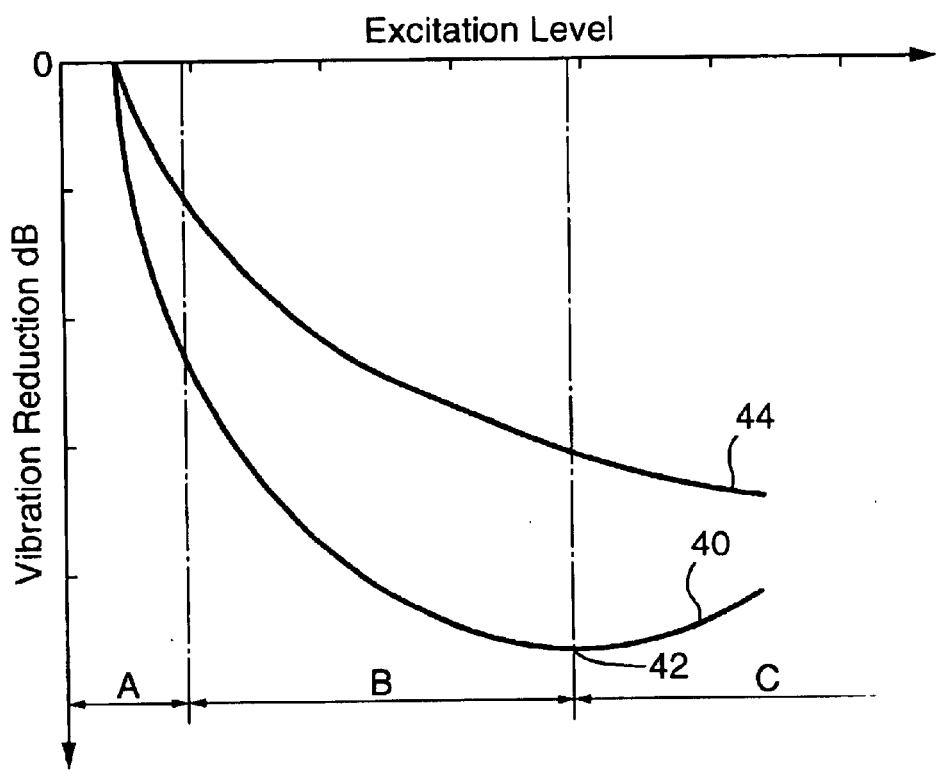
FIG. 3 is a graph showing the relationship between the vibration reduction in dB and the excitation level of the particle damper of the prior art EP00309427.3.

Referring to FIG. 3, which is a graph showing the relationship between the vibration reduction in dB and the excitation level of the particle vibration damper 20 of the prior art EP00309427.3. The particle vibration damper 20 has a diameter D and depth, parallel to the polar axis 34, d thus the aspect ratio is defined as D/d. During experimentation for a 95% volume fill cylindrical particle damper 20, it was found that for aspect ratios generally below 5, the vibration reduction (line 40) went through a minimum 42, after which an increase in excitation led to a lesser vibration reduction performance. Thus there was a loss of damping performance after the minimum 42. For aspect ratios generally above 5 there was no minimum, however, in general the vibration reduction (line 44) was not as great. It was therefore desirable to have a particle damper which did not become relatively less effective at the higher levels of excitation and thus it was taught that it is preferable to have a particle damper having an aspect ratio greater than 5.

Figure 4:
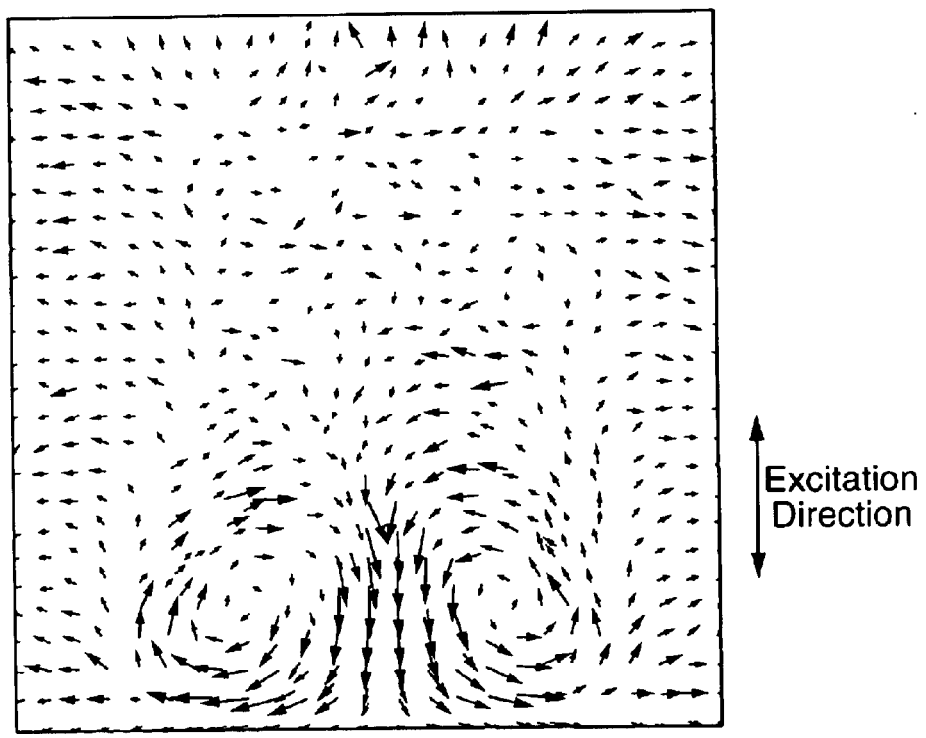
FIG. 4 shows direction of movement of particles when behaving in a convection-like manner.

FIG. 3 also shows three regions A, B, and C which each have different characteristics of particle 28 behaviour found in the prior art application EP00309427.3. Region A comprises the particles 28 behaving analogous to a solid where there is relatively little inter-particle movement and therefore the greatest proportion of damping by the particle damper 20 is derived from its added mass. Region B comprises the particles 28 being sufficiently excited to move relative to one another and rotate about their own axes. The movement of particles 28 is generally local and tends to be relatively slow although there is some amount of convection-like movement within the particle 28 mass. In region B the particles 28 migrate relatively slowly and this relatively slow migration does not appear to have a detrimental effect of the vibration reduction performance. FIG. 4 shows the particles 28 the direction of the particles at a given point in time as they behave in a convection-like manner. This convection-like movement is defined herein as the movement in which an individual particle 28 may migrate from one face 36 to the other face 38 and back to the first face 36 travelling in a general arcuate path. This convection-like movement is analogous to thermal convection currents of a liquid heated by a point source. A substantial amount of vibration damping is derived from the rotational friction between particles 28. Region C is where the particles 28 move relatively rapidly in convection-like arcuate paths. It is believed that movement of this nature reduces the interparticulate frictional rotations and thereby reduces the effectiveness of damping. In region B the slow migration of particle 28 is at such a low speed that it does not effect the damping characteristics of the particle vibration damper 20. Although there are three distinct regions of behaviour shown it is not intended that they are discrete and in fact there is a steady transition of behaviours therebetween.

The present invention relates to configurations of a frictional vibration damper which is configured to substantially prevent the particles or elements (as described herein) behaving in the convection-like manner described hereinbefore. In this way the minimum 42 (or greatest) vibration reduction may be achieved and then maintained for higher excitation levels thereafter. It is not necessary to completely stop the convection-like movement but it is desired to reduce the movement significantly. In so doing the desire to maintain the vibration reduction of the particle damper 20 at the minimum point 42 on the line 40 for excitation levels greater than the minimum point 42 is substantially satisfied. In all the embodiments of the present invention described below the friction vibration damper may define any shape of chamber which is suitable although for each embodiment the preferred shape is shown and described. It is also intended that for each embodiment of the present invention there is a high volume fill of frictional elements within the chamber. This high volume fill is at least 90% although a 95% fill is preferred. Each embodiment will have an optimum volume fill content that may be different from any other embodiment shown and described herein, however, the governing factor is that the volume fill is chosen to maximise the frictional interactions of the elements within the frictional damper. Therefore, as disclosed herein, the design of a friction vibration damper may be optimised by consideration of: friction element percentage volume fill; percentage of element mass and geometry of the particle damper 20. In addition, the friction element size and inter-particle frictional characteristics and material types used for both the friction elements and the damper are also factors in the design of the optimum friction damper for each embodiment.

It should also be noted that the present invention relates to the frictional interaction of the elements with one another and it is a desired intention that the vibration damping characteristic is not derived from the colliding or impacting of particles or elements. The present invention has a further advantage over the collision or impact type of particle damper in that longevity of the damper is significantly improved.

FIG. 5 shows a part cut away of a friction vibration damper 51 of the present invention comprising elongate frictional elements 52. The elongate frictional elements 52 are generally aligned in the direction of a main axis 54 of the damper 51. It is desirable for the principal amplitude of the vibrating host component (not shown) to be normal to the main axis 54 of the friction damper 51. In this way the elongate elements 52 are excited and rotate relative to one another, indicated by the arrows as shown in FIG. 6, thereby damping the vibrations as hereinbefore described. The elongate members 52 have a relatively high aspect ratio and prevent migration parallel to the main axis 54. The elongate elements 52 remain relatively free to migrate in a general circumferential manner although overall the elongate shape of the elements 52 is not conducive to circumferential movement and thus the elements 52 are substantially prevented from behaving in a three-dimensional convection-like manner. It is preferable for the elongate elements 52 to extend substantially the length of the chamber 48. It should also be appreciated that several chambers 48 may be defined within damper 51 and each chamber 48 may comprise elongate elements 52 of different lengths and different diameters. Although it is preferred that the elongate elements 52 are cylindrical in shape it is not essential and other shapes are usable such as elongate cones, or elongate members having elliptical cross section.

FIG. 7 shows a part cut away of a friction damper 51 of the present invention comprising a plurality of low aspect ratio frictional elements 56. The friction damper comprises a body 53, having a main axis 58, and is generally cylindrical and defines a chamber 48, which contains low aspect ratio disc shaped friction elements 56 having a slightly smaller diameter than the chamber 48. It is desirable for the principal amplitude of the vibrating host component (not shown) to be normal to the main axis 58 of the friction damper 51. The friction damper 51 will also provide damping when the main axis 58 is aligned generally parallel to the principal amplitude of the vibrating host component. In this configuration of the present invention the disc shaped elements 52 rotate relative to one another, as shown in more detail in FIG. 8, thereby damping vibrations by the frictional interaction of the elements 56 as hereinbefore described. The disc elements 56 each have a low aspect ratio and substantially occupy the diameter of the chamber, thus completely prevent migration of elements within the chamber 48. For this embodiment of the present invention it is important that the correct percentage fill is used. It is believed that a high percentage by volume, as described hereinbefore, of above 90% is necessary for this embodiment to operate successfully. The percentage fill has been defined as the percentage of the maximum number of element that the chamber can accommodate, however, the present invention must also comprise sufficient space both in the normal and parallel directions, to the main axis 58, for the disc elements 56 to be able to rotate relative to one another and yet be close enough to interact in frictional contact to provide damping. Thus a percentage fill in this embodiment relates to the number of disc shaped elements 56 which and not the actual spatial volume remaining in the chamber 48.

FIG. 9 is a section of a friction damper 51 of the present invention comprising a body 55 and a plurality of relatively low aspect ratio frictional elements 60. The friction damper 51, having a main axis 62, is generally cylindrical and defines the chamber 65, which contains low aspect ratio disc shaped friction elements 60. The elements 60 are substantially smaller than the disc elements 56 of the previous embodiment. As shown in FIG. 11 the elements 60 are essentially short solid cylinders having flat ends 63, however, disc elements 60 having convex ends 63 are equally suitable. Similarly, although it is preferable to have a generally circular cross-section elements 60 having a polygonal circumference may also be used to similar effect.

Referring again to FIG. 9, it is desirable for the principal amplitude of the vibrating host component (not shown) to be parallel to the main axis 62 of the friction damper 51. The friction damper 51 also provides good damping characteristics when the main axis 62 is aligned generally normal to the principal amplitude of the vibrating host component. When excited by vibrations the disc elements 60 vibrate and rotate relative to one another thereby damping the vibrations of host component by frictional interaction of the elements 60 as hereinbefore described. With a high density fill (approximately 95% by volume) and the low aspect ratio of the disc elements 60 it is more difficult (than for spherical elements) for each element 60 to undertake the convection-like path, as shown in FIG. 4. The shape of each element 60 is such that the discs generally remain in the orientation shown in FIG. 9 and FIG. 10, which is section B—B on FIG. 9, occupying their lowest potential energy positions. Although not all migratory movement is prevented the migration of elements 60 within the chamber 65 in a convection-like manner is substantially curtailed. In this way the friction element 60 vibration damping reduction is maintained at its preferred minimum (reference numeral 42 on FIG. 3) for excitation levels beyond the point where the minimum on the vibration reduction versus excitation level graph is first reached.

FIG. 12 is a section through a friction damper 51 of the present invention, and shows the friction damper 51 comprises a body 57 which defines a chamber 67. The chamber is substantially filled with a plurality of substantially spherical elements 28 and substantially disc shaped elements 60. This embodiment is essentially similar in configuration to the prior art vibration damper 20 (FIGS. 1 and 2) except for the addition of the disc shaped elements 60. The elements 60 are disposed throughout the chamber 67 and provide a partial barrier to prevent free convection-like movement of the substantially spherical elements 28. Some convection-like movement is preferable otherwise the disc shaped elements 60 and substantially spherical elements 28 have a tendency to separate into generally discrete groups within the chamber 67. It is intended therefore that the introduction of the disc shaped elements 60 reduces the substantially spherical elements 28 behaving in a convection-like manner. It should be appreciated that the disc shaped elements 60 also frictionally interact with one another and the elements 28 to provide vibration damping to the vibrating host component.

The size and shape of the disc elements 60 is currently undetermined, however, for the disc shaped elements 60 to reduce the amount of convection-like migration of elements 28 it is estimated that the disc shaped elements 60 should have a preferred diameter greater than that of the spherical elements 28 and may have a diameter substantially similar to that of the chamber 67.

Alternatively to the embodiment described herein the friction damper 51 will operate in similar manner to that described above where the friction damper 51 is any polyhedral shape and the elements 60 are any relatively low aspect ratio polyhedral shape.

Figure 13:
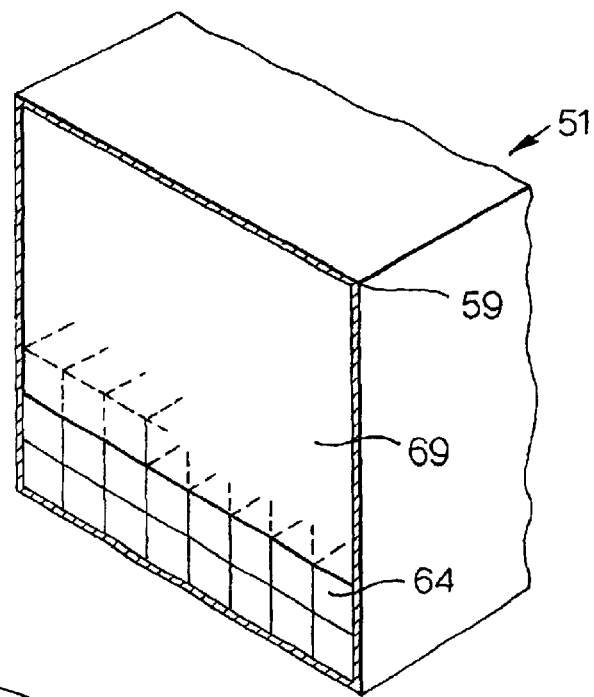
FIG. 13 is a section through a friction damper of the present invention and shows the friction damper filled with cubic shaped elements.

FIG. 13 is a section through a friction damper 51 of the present invention, and shows the friction damper 51 comprising a body 59 defining a chamber 69. The chamber 59 is substantially filled with cubic elements 64, which are of a preferred shape, and arranged in a generally regular arrangement. The chamber 69 preferably comprises approximately a 95% fill by volume of cubic elements 64 although a fill over 90% is suitable. In this embodiment it the preferred percentage fill is literally the volume occupied by the cubic elements 64 as a percentage of the volume of the chamber 69. Thus the size of the elements 64 and the chamber 69 require specifically designing. When excited by the vibrations of the host component, each element 64 is energised by the vibrations and is therefore able to interact in frictional contact with its surrounding element 64 or wall of the frictional damper 51 thereby converting the vibrational energy of the host to heat and sound energy via. Although this embodiment of the present invention operates in broadly similar fashion to the aforementioned prior art particle damper 20 it does differ in that the elements 64 do not rotate, but instead it is the surfaces of the elements 64 sliding over one another that provides the mechanism for damping the vibrations of the host component. Indeed due to the inherent shape of the cubic elements 64 of this embodiment that there is no rotation and similarly the configuration prevents the elements 64 from undergoing any convection-like behaviour. Thus this damper 51 is able to maintain its greatest vibration reduction for excitation levels greater than that where the minimum point (42) is first achieved.

Figure 14:
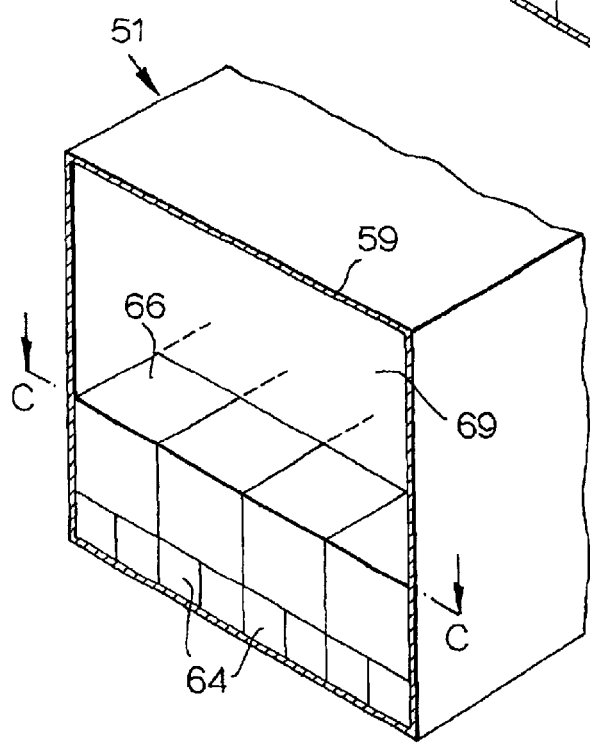
FIG. 14 is a isometric cut-away view of the friction damper described with reference to FIG. 13 and shows a further configuration of cubic elements arranged into discrete layers of discrete element.

Although FIG. 13 shows and is described as having cubic elements 64 of one size, FIG. 14 shows a further embodiment of a configuration comprising a number of different sizes of cubic friction elements 64, 66. It is an advantage of this particular embodiment that the sizes of the elements and therefore their masses are different. In having elements 64, 66 of differing masses each discrete size will vibrate at different frequencies and thus the frictional interactions of the elements are enhanced as elements 64 of the same size do not "stick together". "Sticking together" can occur when the elements vibrate at the same amplitude and frequency and thus effectively act as one mass. As the friction elements operate on the principle of their surfaces rubbing or sliding over one another then this embodiment is particularly suitable as it makes use of surfaces which have larger contact areas than for the prior art particles, which only have point contacts.

Figure 15:
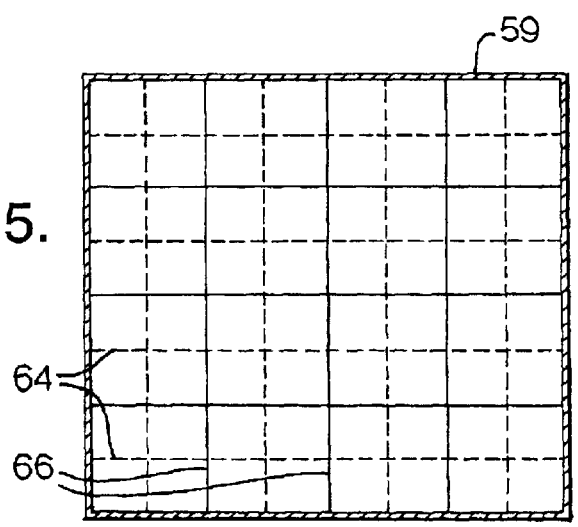
FIG. 15 is section C—C through the friction damper described with reference to FIG. 14.

Referring now to FIGS. 14 and 15, FIG. 14 shows a further configuration of cubic elements 64, 66 which are arranged into discrete layers of discrete element sizes and FIG. 15 shows section C—C through the friction damper 51. Although cubic elements 64, 66 are shown, other polyhedral shapes may be used which comprise substantially flat sides arranged to abut one another in frictional sliding association during operation of the damper 51. Another preferred shape of element is a parallelepiped element as these elements may easily be configured to fit a regular chamber 69 shape. In the embodiment shown in FIG. 14 it is an advantage for the damper 51 to comprise elements 64, 66 of different sizes. In arranging the elements 64, 66 into discrete layers, for instance as shown in the figure, the elements 64, 66 are further prevented from migrating in convection-like manner as an element from one layer can not physically displace an element from a layer of different discrete element size.

FIGS. 16 and 17 show a further embodiment of the present invention and in particular show the friction damper 71 comprising a chamber 73 substantially filled with tetrahedral shaped element 68. Again it is intended that the elements 68 occupy approximately 95% by volume of the chamber 73 although any volume fill over 90% is suitable for the present invention to operate in the desired manner disclosed herein. This embodiment of the present invention operates in a similar manner to the embodiment described hereinbefore with reference to FIGS. 13, 14 and 15. The interlocking configuration of the tetrahedral shaped elements 68 ensure that there is substantially no convection-like movement of elements 68. Furthermore pyramid shaped elements may be alternatively used in similar configuration to the tetrahedral elements 68.

FIG. 18 is a section through a friction damper 51 and shows a further embodiment of the present invention comprising the friction damper 51 having a cylindrical body 81 which defines a chamber 82. Disposed within the chamber is a plurality of substantially spherical elements 28 and a number of baffles 76, 78. The cylindrical body 80 comprises a central axis 74, an annular wall 84 surrounding the central axis 74 and end walls 86, 88. The baffles 76, 78, in this embodiment, are attached to the annular wall 84 and extend radially inwardly. It is preferred that the principle direction of greatest amplitude of the vibrating body is parallel to the central axis 74 although this is not essential. The elements 28 interact with one another to provide the damping characteristics of the prior art disclosed herein except that the provision of baffles 76, 78 reduces the convection-like migration flow pattern of the prior art. Therefore the performance of the friction damper 51 is an improvement over the prior art in that once the minimum on the vibration reduction graph (FIG. 4) is achieved it is maintained through any increase in excitation level as the present invention substantially reduces the convection-like movement of elements that would otherwise lead to a loss of vibration reduction ability. The exact configuration this embodiment of the present invention will be determined by the amount of damping required, the size of the elements, the exact percentage fill of elements 28 and the number and radial extent of the baffles 76, 78. Lower aspect ratio friction dampers 51 would require fewer baffles 76, 78.

Alternatively, the baffles may extend from either end wall 86, 88 in a generally parallel direction to the central axis 74. The baffles 76, 78 need not be straight and need not be in any particular alignment except in that the baffles 76, 78 should extend far enough into the chamber 82 to reduce the convection-like movement of elements 28. It is not an essential requirement of this embodiment of the present invention for the body 81 to be cylindrical as other shapes of friction damper are able to provide a damping effect in similar manner to the specific embodiment shown and described herein.

FIG. 19 is a section through a further embodiment of the present invention and shows a friction damper 51 having a cylindrical body 91 which defines a chamber 92. Disposed within the chamber 92 is a plurality of substantially spherical elements 28 and a "wire wool" structure 94. The wire wool structure 94 comprises a tangled mass of relatively thin wires, which are intertwined to a sufficient density to reduce the convection-like flow of the elements 28, when subject to a vibration source.

FIG. 20 is a cut away of another embodiment of the present invention and shows a friction damper 51 having a cylindrical body 102 which defines a chamber 104. Disposed within the chamber 104 is a plurality of substantially spherical elements 28 and a mesh 106. The mesh 106 is arranged to allow the elements 28 to pass through but is of sufficient density to prevent the substantial convection-like movement of the elements 28 within the chamber 104. In particular the mesh 106 prevents the rapid convection-like movement of the particles 28.

The friction vibration damper of the present invention has been found to damp the vibrations of a vibrating component vibrating in the range 0–1 kHz, however, it is believed that frequencies up to 10 kHz will be damped by the friction damper. Similarly excitation levels up to 100 g have been successfully tested and it is apparent that higher excitation levels will be equally applicable to the friction damper.

With reference to the present invention a method of damping the vibrations of a vibrating body in herein disclosed. The method comprises the steps of, locating the position of the greatest amplitude of vibration on the vibrating body and disposing a friction damper on the vibrating body at the position of the greatest amplitude of vibration. However, it should be noted that where access is limited the friction damper 51 may be disposed to any vibrating part of the vibrating component to provide vibration damping. Disposing the friction damper to the point of greatest amplitude merely provides the preferred location.

Although the present invention has been described with reference to the friction damper 20 having a chamber, two or more chambers may be provided each filled with a plurality of elements.

Although the present invention has been described with reference to the friction damper having a chamber filled with a plurality of elements of substantially the same size, the chamber may be filled with a plurality of elements of more than one discrete size. Similarly each of the chambers may be filled either with a plurality of elements of the same discrete size, different discrete sizes in each chamber or a number of discrete sizes within each chamber.

Although the present invention has been described with reference to a plurality of elements 28 with a diameter of 0.6 millimeters the plurality of elements 28 may have a diameter in the range 0.1 to 5.0 millimeters and which are all suitable for use with the applications described herein. However, it should be understood from the teachings of the present invention that for other applications where smaller or larger vibrating bodies require damping that the size of the friction vibration damper should be selected accordingly and similarly that the size of the elements may be selected that are outside the range 0.1 to 5.0 millimeters.

Although the present invention has been described with reference to a plurality of elements which are metallic the plurality of elements may be ceramic. Similarly, although the present invention has been described with reference to the friction vibration damper being manufactured from metal, in particular steel the friction vibration damper may be manufactured from ceramic material.

Although the present invention has been described with reference to the chamber being partially filled with a plurality of elements each of the chambers may be filled to a different percentage by volume.

Although the present invention has been described with reference to a substantially cylindrically shaped friction damper, a polyhedral or particularly a parallelepiped shaped friction damper may be used to similar effect.

Although the friction damper has been described with reference to attenuating vibrations of a vibrating body, the vibrating body may specifically be a non-rotating component of a gas turbine engine or components such as a workpiece or tool subject to vibrations derived from a machining process.

The workpiece may be any industrially manufactured item which undergoes some form of machining process, for example milling, cutting, turning, drilling, broaching, riveting or grinding that may result in the workpiece vibrating. The object of the present invention being to provide vibration damping to such an item during such a machining process.

The description of the present invention relates to a friction damper being permanently disposed to a vibrating component. However, in certain circumstances it is desirable for the friction damper to be disposed to the workpiece by temporary attachment means (not shown). The temporary attachment means may comprise any conventional attachment means as known in the art and be a form of a clip mechanism, a conventional strap, secured by Velcro™ or buckle, welding, soldering, a screw thread, a bayonet type fitting, an interference fit arrangement, a suction pad or by magnetic means. All types of fitting having the common general purpose of temporarily attaching the vibration particle damper to the vibrating structure. The friction damper may also be applied to the tool of the machine, or to the machine itself, to damp the vibrations thereof in a similar manner.

Application of the friction vibration damper to a workpiece, tool or machine has the additional advantage of attenuating acoustic emissions derived during the machining process.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A friction damper for damping the vibrations of a vibrating component comprising a body defining at least one chamber, the at least one chamber being partially filled with a plurality of particles to at least 90% fill such that the particles are able to move relative to one another, the friction vibration damper, in use, disposed on or in the vibrating component wherein the friction vibration damper comprises at least one baffle extending from the body into the chamber to substantially prevent the particles operationally moving in a convection-like flow pattern.

2. A friction vibration damper as claimed in claim 1 wherein the body defines a central axis and the at least one baffle extends in a place substantially parallel to the axis.

3. A friction vibration damper as claimed in claim 1 wherein the body defines a central axis and the at least one baffle extends in a plane substantially perpendicular to the axis.

* * * * *